United States Patent
Goldstein et al.

[11] 3,792,370
[45] Feb. 12, 1974

[54] IMPROVED OPTICAL CAVITY FOR A LASER

[76] Inventors: Irving Goldstein, 31 Peacock Farm Rd., Lexington, Mass. 02173;
Werner R. Rambauske, 170 Acton St., Carlisle, Mass. 01741

[22] Filed: Aug. 11, 1972

[21] Appl. No.: 279,914

Related U.S. Application Data
[63] Continuation of Ser. No. 203,811, Dec. 1, 1971.

[52] U.S. Cl. .............................................. 331/94.5
[51] Int. Cl. .............................................. H01s 3/08
[58] Field of Search ............ 350/293, 294; 331/94.5

[56] References Cited
UNITED STATES PATENTS
3,363,196  1/1968  Eknayan ............................ 331/94.5

Primary Examiner—William L. Sikes
Attorney, Agent, or Firm—Philip J. McFarland et al.

[57] ABSTRACT

A catoptric lens arrangement which is adapted to use with high power radiant energy, as from a laser, is shown. The entrance mirror of the contemplated lens arrangement has a convex reflective surface so that the radiative flux density at the entrance mirror is less than the radiative flux density in a laser beam. The various mirrors in the contemplated lens arrangement further are arranged so that each such mirror may be conductively cooled with aperture blockage reduced to a minimum or eliminated altogether.

2 Claims, 3 Drawing Figures

IMPROVED OPTICAL CAVITY FOR A LASER

This application is a Continuation of application Ser. No. 203,811 filed Dec. 1, 1971 by Irving Goldstein and Werner R. Rambauske entitled "Conductively Cooled Catoptric Lens Arrangement."

BACKGROUND OF THE INVENTION

This invention pertains generally to catoptric lens arrangements and particularly to catoptric lens arrangements which are adapted to use with high power wave-propagated radiant energy sources.

With the development of lasers, the problem of providing lens arrangements that may withstand the extremely high concentration of energy in a laser beam has become more and more difficult to solve. The problem is especially acute when a continuous, or high peak power, laser beam is passed through a lens arrangement. Obviously, under such conditions, heating of the lens elements may affect, or even destroy, their required mechanical stability.

Another problem is that aperture blockage of any lens arrangement must be reduced to a minimum or eliminated altogether. It is well known to eliminate aperture blockage by using a refractive lens arrangement. Unfortunately, however, there are no known materials for refractive lens elements capable of being heated to the degree required to operate with a high power laser beam. It has been found that a refractive lens arrangement may be used with a high power laser beam only in special applications, i.e., applications in which destruction of the lens elements may be tolerated.

With a catoptric lens arrangement, the increased thermal conductivity of the lens elements makes such elements inherently more resistant to deleterious effects of heating. Further, because a lesser amount of the energy in a laser beam is converted to heat in a catoptric lens arrangement than in a refractive lens arrangement, the heating problem is less difficult in a catoptric lens arrangement. Even so, however, the energy, i.e., the radiative flux, in any laser beam is so high as to cause intolerable localized heating (especially in the entrance mirror) within a catoptric lens arrangement. As a result of such heating, shape of the reflecting surfaces in such a catoptric lens arrangement may be significantly changed or even destroyed. Further, it is far more difficult to avoid aberrations in any known catoptric lens arrangement or to provide an arrangement of such type which does not suffer aperture blockage.

A heating problem may also be encountered when a laser beam is being generated. That is, the parallel mirrors defining the optical cavity in a laser may be heated excessively because the laser beam is concentrated over its smallest area within the optical cavity. Such difficulty may, obviously, be ameliorated if the laser beam could be expanded in size but, to date, no practical design of an optical cavity for lasers is known with "beam expansion."

SUMMARY OF THE INVENTION

Therefore, it is a primary object of this invention to provide an improved catoptric lens arrangement which is adapted to use with a high power laser beam.

Another object of this invention is to provide an improved catoptric lens arrangement in which the lens elements intrinsically are more capable of withstanding the heating effects of a high power laser beam.

Still another object of this invention is to provide an improved catoptric lens arrangement which may be used in an optical cavity of a laser to increase the area of mirrors defining an optical cavity.

These and other objects of this invention are attained generally by providing in a first embodiment of a catoptric lens arrangement for use with a high power laser beam, an entrance mirror having an ogival shape on which the laser beam falls. The entrance mirror is so oriented with respect to the beam that the illuminated area of the entrance mirror is very much greater than the cross-sectional area of the laser beam. In addition, a liquid coolant may be passed through the interior of the entrance mirror.

In a second embodiment, at least one catoptric lens arrangement (using two complementary paraboloidal mirrors) is disposed within the optical cavity to expand the cross-sectional area of the laser beam before such beam falls on a cavity-defining mirror.

DESCRIPTION OF THE PREFERRED EMBODIMENTS

For a more complete understanding of this invention, reference is now made to the following description of the drawings, in which.

Figure 1:
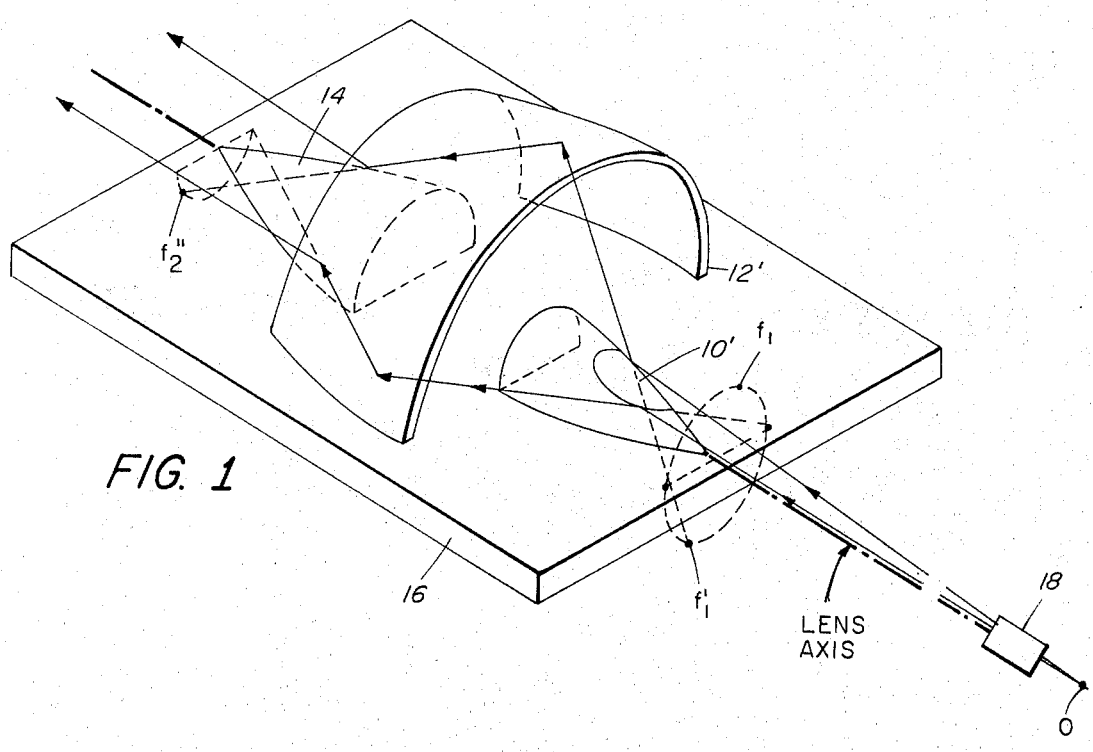
FIG. 1 is a view of a first embodiment of a catoptric lens arrangement according to this invention, the illustrated lens arrangement being somewhat simplified to illustrate most clearly the relationship of the various lens elements therein and the way in which the energy in a laser beam is spread across each one of such elements.

Referring now to FIG. 1, it may be seen that a lens arrangement according to this invention includes a "confocal" entrance mirror 10, a secondary mirror 12 and an exit mirror 16 mounted on a base 16. The just mentioned mirrors are of the type shown and described in detail in a patent application entitled "Catoptric Lens Arrangement" by Werner R. Rambauske filed concurrently herewith and assigned to the same assignee as this application. Briefly, the reflecting surface of the entrance mirror 10 here corresponds to the surface generated by nutating a portion of a branch of a hyperbola about the lens axis (not numbered) so that the focal point of such branch describes a semicircle, $f_1$, centered on the lens axis. The focal point (referred to herein as the "conjugate" focal point) of the complementary branch of the hyperbola is maintained on the lens axis. It will be recognized that one characteristic of the hyperbola is that the tangent at any point on one branch bisects the angle formed by lines from the focal points of the two branches. It follows, then, that any ray from a point source at the conjugate focal point of the entrance mirror 10 will, upon reflection, have appeared to have originated at a point on the semicircle, $f_1$. Similarly, the reflecting surface of the exit mirror 16 corresponds to the surface generated by nutating a selected portion of a branch of a second hyperbola about the lens axis. The focal point of the second branch then describes a semicircle, $f_2$, centered on the lens axis. It will be recognized that if rays apparently originate from a point on the semicircle, $f_2$, such rays, on reflection from the exit mirror 14, will be directed toward the conjugate focal point of the second hyperbola. The reflecting surface of the secondary mirror 12 corresponds to the surface generated by nutating a portion of an ellipse about the lens axis in such a manner that one focal point of such ellipse describes a semicircle coinciding with the circle, $f_1$, and the other focal point of the ellipse describes a semicircle corresponding to the semicircle, $f_2$. It follows then that the bodies of the entrance mirror 10 and of the exit mirror 14 are halves of ogives and that the body of the secondary mirror 12 is half a parellipsoid. The three mirrors are placed on the base 16 and adjusted by any convenient means (not shown in this Figure) so that the longitudinal axis of each one corresponds with the lens axis and the focal semicircles of the entrance mirror 10 and the secondary mirror 12 are coincident. For reasons which will become clear hereinafter, the exit mirror 14 and the secondary mirror 12 may be positioned relative to one another so that their corresponding focal circles are slightly displaced from each other along the lens axis.

In operation, a beam from a laser 18 is directed along the lens axis so as to fall on the entrance mirror 10. As is known, such a beam diverges to some extent, so the laser 18 is placed along the lens axis in such a position that the laser beam apparently originates at the focal point of the second branch of the hyperbola. Each ray in the laser beam, after reflection from the entrance mirror 10, appears to have originated at an image point along the semicircle $f_1$ and is directed to the secondary mirror 12 in the form of a diverging beam. After reflection from the secondary mirror 12, the rays are directed toward points on the semicircle, $f_2$, but are reflected from the exit mirror 14 before reaching such semicircle. The image point of each ray reflected from the exit mirror 14 is a point on the semicircle $f_2$. Therefore, each such reflected ray is directed to the conjugate focal point (not shown) of the exit mirror 14. When the focal circles of the quadratic conic sections from which the secondary mirror 12 and the exit mirror 14 are adjusted properly the illustrated lens arrangement is "aberration-free" for paraxial rays in a laser beam. Therefore, the illustrated lens arrangement is "diffraction limited."

It will be observed that because the projection of the laser beam on the entrance mirror 10 is larger than the cross-sectional area of the laser beam, the radiative flux density of such beam is lower at the reflecting surface of such mirror. There is, consequently, inherently less heating of the entrance mirror 10 than if the laser beam fell directly on the reflecting surface. Further, it will be obvious that, because the entrance mirror 10 is in intimate physical contact with the base 16 (which serves as a heat sink), heat generated in the entrance mirror 10 is conducted therefrom.

The base of each one of the various mirrors preferably is electroformed of nickel or copper using a stress-free stainless steel or invar mandrel of proper shape. The reflecting surface of each one of various mirrors is then formed by electroplating gold or an aluminum film over the base. It will be apparent, therefore, that the coefficient of superficial expansion of each one of the various mirrors (especially the entrance mirror 10) may be made to be relatively low.

Figure 2:
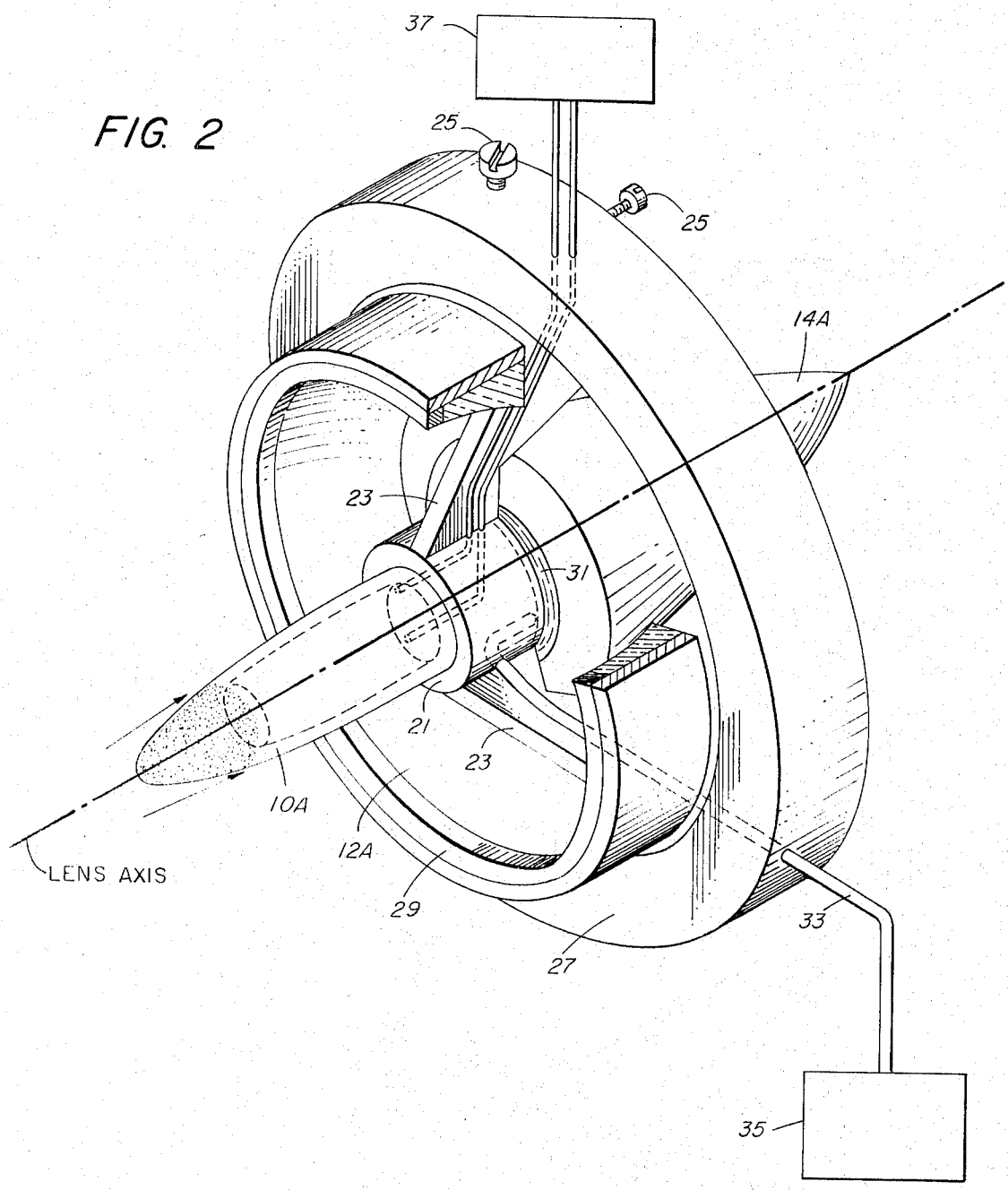
FIG. 2 is a view of a second embodiment of this invention, again being somewhat simplified, showing how increased cooling of the lens elements may be effected.

Referring now to FIG. 2, it may be seen that the concepts of this invention may be followed to provide a catoptric lens arrangement wherein the lens elements are symmetrical about a lens axis. Thus, an entrance mirror 10A is mounted on a hub 21 to which a number of spiders 23 (two being visible in the FIGURE) are affixed. Each one of the latter, in turn, is connected by adjusting screws 25 to a mounting ring 27. A secondary mirror 12A is mounted within the mounting ring 27 by means of a retaining ring 29. An exit mirror 14A is slidably mounted on the hub 21, the two being connected through a bellows 31 as shown. The hub 21, the exit mirror 14A and the bellows 31 define a chamber (not shown) which is connected, through a passage (not numbered) in the hub 21 and one of the spiders 23 to a pipe 33. It may be seen, therefore, that a fluid (not shown) may be introduced under pressure to the chamber from a pump 35 so that the longitudinal position of the exit mirror relative to the hub 21 may be adjusted.

In this embodiment, the entrance mirror 10A and the secondary mirror 12A are similar to the corresponding mirrors of FIG. 1, the difference being that the entrance mirror 10A is a full ogive and the secondary mirror 12 is a full parellipsoid having confocal focal circles, $f_1$. The reflecting surface of the exit mirror 14A here is a full ogive corresponding to the surface of revolution described by rotating a portion of a parabola about a line removed from the vertex. The focal point of such parabola then may be caused to describe a circle which corresponds to the focal circle not shown, but referred to as focal circle, $f_2$, of the secondary mirror 12A. It will be noted that the lens arrangement just described may, disregarding the effect of diffraction, be considered to be one which converts a diverging beam to a collimated beam. If it is desired to convert a diverging beam to a converging beam, then it is simply a matter of replacing the exit mirror 14A with a hyperboloidal mirror, as exit mirror 14 (FIG. 1).

It will now be apparent that, assuming the line of symmetry of the secondary mirror 12A to be the lens axis, the position of the other mirrors may be adjusted as required. Thus, by movement of the adjusting screws 25, the position of the entrance mirror 10A relative to the secondary mirror 12A may be changed as required to move the focal circles of the former into coincidence with one of the focal circles of the latter. The fluid pressure within the chamber may then be varied as desired to move the focal circle of the exit mirror 14A relative to the second focal circle of the secondary mirror 12A.

It will be observed now that paraxial rays from a point source at the conjugate focal point of the entrance mirror 10A will, after reflection from the three mirrors, emerge as parallel rays. Therefore, if a laser (not shown) is positioned so that its slightly divergent rays apparently originate from such conjugate focal point, then the emergent rays will be parallel (absent diffraction). If, however, the laser is not located properly along the lens axis, there will be some spherical aberration, i.e., rays from the secondary mirror 12A will not be directed to the focal circle, $f_2$, but rather will be directed toward a focal circle displaced therefrom along the lens axis. It may be seen now that adjustment of the position of the exit mirror 14A along the lens axis will compensate for such spherical aberration. The illustrated lens arrangement may, therefore, be free of achromatic aberrations for a divergent beam from a point source along the lens axis. The emergent beam may, consequently, be diffraction limited.

A coolant (not shown) may be forced through channels in the body of the entrance mirror 10A, by operation of a circulating pump 37 as shown. It will be evident now that the radiative flux density in a laser beam may be increased greatly without fear of distortion or destruction of the entrance mirror 10A. The exit mirror 14A could, obviously, be cooled similarly although the radiative flux density on such mirror is not as high.

The secondary mirror 12 may be cooled in any conventional manner.

Figure 3:
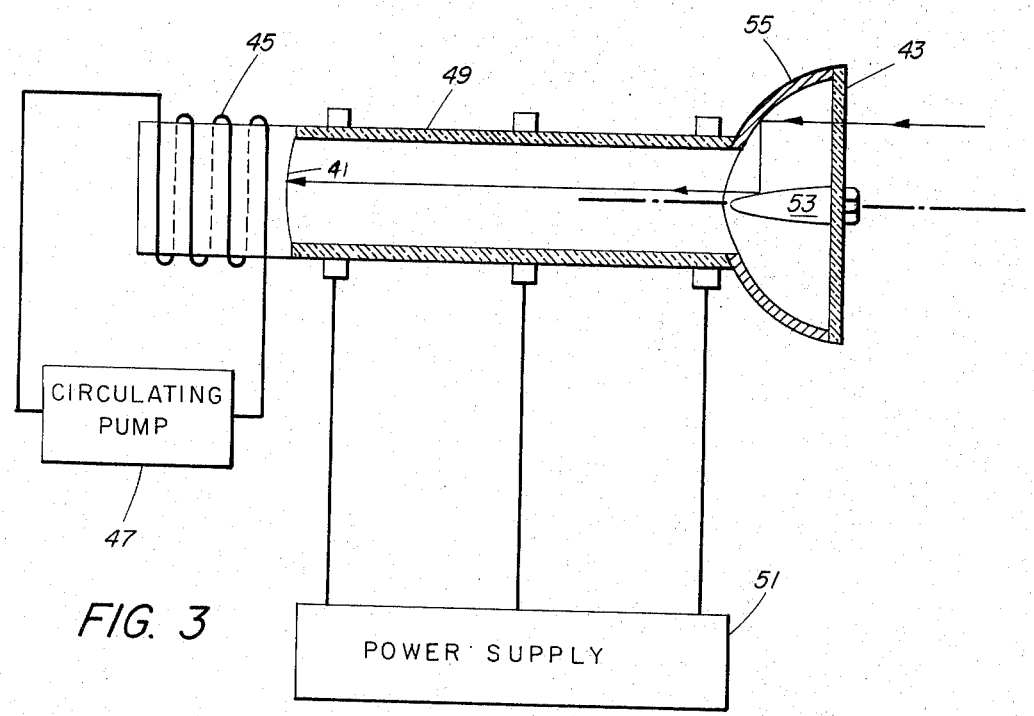
FIG. 3 is a simplified cross-sectional sketch, illustrating particularly the optical cavity of a laser incorporating a catoptric lens arrangement according to this invention.

Referring now to FIG. 3, it may be seen that the concepts of this invention may be incorporated in the optical cavity of a laser to reduce the radiative flux density on at least one of the reflectors in such cavity. Thus, in FIG. 3 the optical cavity of a laser is shown to be terminated in a totally reflecting spherical reflector 41 as shown by Boyd et al., in U. S. Pat. No. 3,055,257 and partially transmissive reflector 43. The former reflector may be force cooled by passing a coolant (not shown) through a coil 45 connected to a circulating pump 47. The optical cavity is completed by a tube 49 on which electrodes (not numbered) are mounted. The electrodes are energized by a power supply 51 so as to excite a lasing gas, as $CO_2$, within the optical cavity as shown. The primary mirror 53 is here an ogive corresponding to the surface obtained by rotating a portion of a first parabola about an axis removed from its axis of symmetry; the secondary mirror is concave, corresponding to the surface obtained by rotating a portion of a second parabola about an axis removed from its axis of symmetry. The circles formed by the foci of the first and the second parabola are coincident.

It may be seen that the reflectors 41, 43 form a Fabry-Perot interferometer. The coherent beam striking the latter mirror is, however, distributed around in a circle. It follows, then, that the radiative flux density at the reflector 43 is less than the radiative flux density at the reflector 41. It will be observed that a hollow ring-shaped beam emanates from the just described laser. Such a beam may, if desired, be converted into a solid beam by providing a third and a fourth mirror, one corresponding to the primary mirror 53 and the other corresponding to the secondary mirror 55.

It will now be evident that the disclosed "beam expander" is operative in an optical cavity by reason of the fact that it does not affect the coherency of the oscillations within the optical cavity of the laser. It follows, then, that a catoptric lens arrangement of the type disclosed may be used with any type of laser. That is, a catoptric lens arrangement according to the invention may be used with pulsed lasers or solid state lasers.

Having described exemplary embodiments of our invention, it will now be clear to one of skill in the art that many adaptations and modifications of such embodiments may be made without departing from our inventive concepts. For example, various combinations of quadratic conic sections (meaning all of the conic sections except the circle) may be used as generatrices of the different mirros. Further, each selected portion of each such section may be rotated or nutated as required for different applications. Still further, it is evident that the forced cooling approach (FIG. 2) may be combined with the "heat sink" approach (FIG. 1). It is felt, therefore, that this invention should not be restricted to its disclosed embodiments but rather should be limited only by the spirit and scope of the appended claims.

What is claimed is:

1. In a laser, the optical cavity therein including at least one partially transmissive reflector and a second reflector disposed along the longitudinal axis of such cavity to define the ends thereof, the improvement comprising:
   a. a first catoptric lens element disposed between the ends of the optical cavity, the reflecting surface of such element being ogival in shape; and
   b. a second catoptric lens element concentrically mounted around the first catoptric lens element.

2. The improvement as in claim 1 wherein:
   a. the reflecting surface of the first catoptric lens element corresponds to the shape formed by rotating a selected portion of a first parabola about the longitudinal axis of the cavity; and
   b. the reflecting surface of the second catoptric lens element is concave, corresponding to the shape formed by rotating a selected portion of a second parabola about the longitudinal axis of the cavity, the focal circle of such second parabola being coincident with the focal circle of the first parabola.

* * * * *

UNITED STATES PATENT OFFICE
CERTIFICATE OF CORRECTION

Patent No. 3,792,370      Dated February 12, 1974

Inventor(s) Irving Goldstein and Werner R. Rambauske

It is certified that error appears in the above-identified patent and that said Letters Patent are hereby corrected as shown below:

On the title page insert:

[73] Assignee: Raytheon Company, Lexington, Mass.

Signed and sealed this 2nd day of July 1974.

(SEAL)
Attest:

EDWARD M. FLETCHER,JR.      C.MARSHALL DANN
Attesting Officer           Commissioner of Patents